July 28, 1931.  J. C. HANNA  1,816,677
GEARED ROLLER WEDGE RIVETER
Filed March 29, 1929
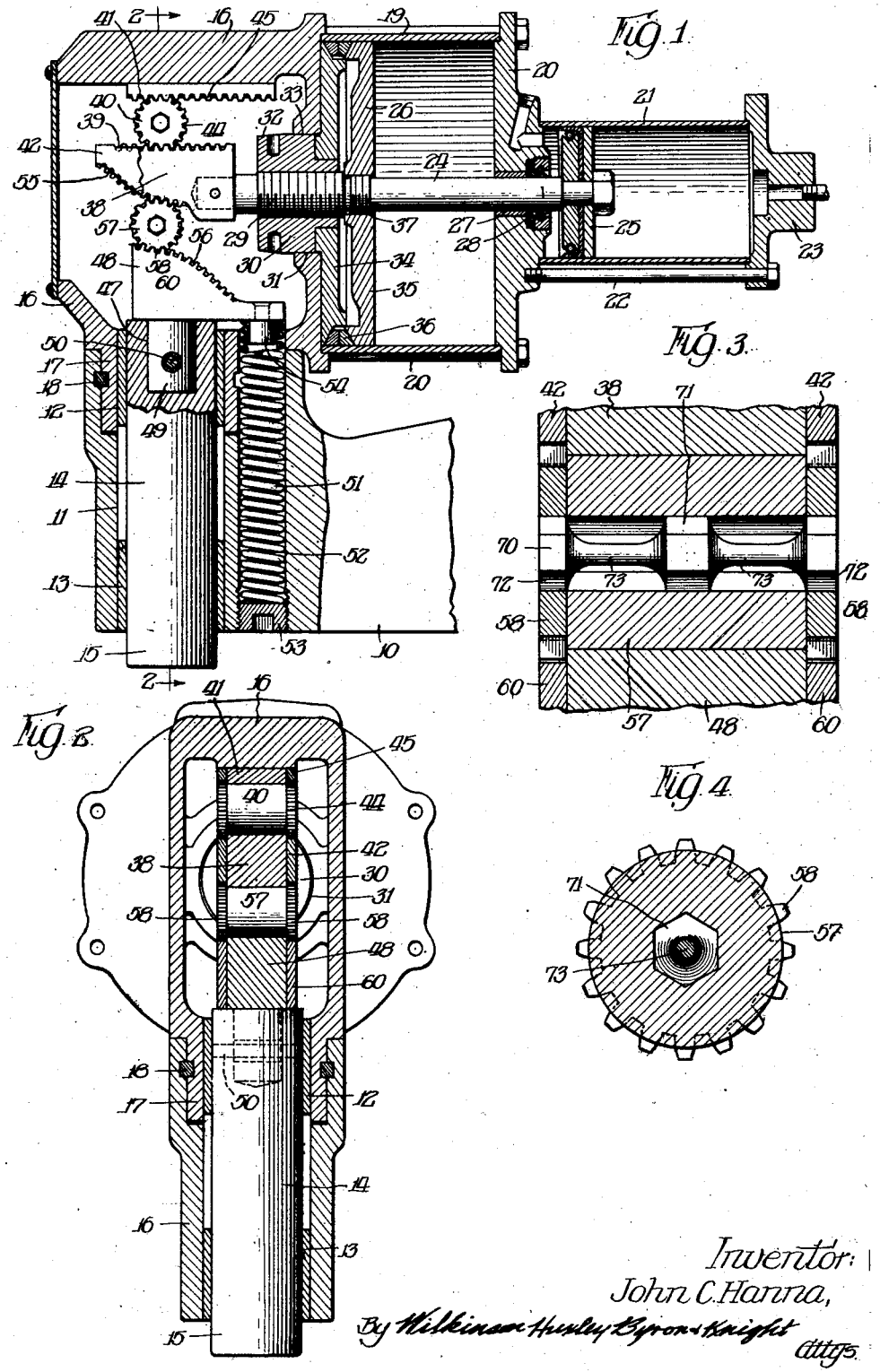

Patented July 28, 1931

1,816,677

UNITED STATES PATENT OFFICE

JOHN C. HANNA, OF CHICAGO, ILLINOIS, ASSIGNOR TO HANNA ENGINEERING WORKS, OF CHICAGO, ILLINOIS, A CORPORATION OF ILLINOIS

GEARED ROLLER WEDGE RIVETER

Application filed March 29, 1929. Serial No. 351,007.

This invention relates to improvements in the means utilized for variably transmitting the pressure from one movable member generally actuated by fluid pressure to another movable member which may comprise a movable arm or a plunger of a machine for performing riveting, punching, stamping, pressing or like operations. Said improvements have been especially developed for use in connection with riveting machines of the type having a movable plunger in which the pressure is transmitted to said plunger from the fluid cylinder by an application of the principle of the inclined plane as embodied by an irregular cam surface for obtaining a variable riveting pressure.

It is especially desirable that the pressure during a riveting operation should not be uniform during the riveting operation or even comprise a uniformly increasing pressure but instead should comprise a compound pressure curve relative to the movement of the riveting plunger. In one arrangement the initial leverage may be one-twentieth of the final leverage, while at the half stroke, the leverage is only one-fifth of the final leverage. The maximum pressure may be reached at seven-eighths stroke and maintained to the end of the stroke. The usual forms of leverage means transmitting pressure from a fluid pressure cylinder to the riveting plunger cannot be designed to provide such a compound curve of variable leverage and resulting variable pressure, but I have found that a roller wedge mechanism may be used in which the cam surface of the wedge may be designed to give the desired leverage and resulting pressure at the various points of the stroke. In its simplest form I might use a compound wedge contacting with a fixed circular surface whereby as the angle of pressure is varied, contacting surfaces are maintained substantially tangential but in such form the friction loss, due to the relatively movable contacting surfaces would be excessive. Therefore, I might use a movable roller in place of the fixed circular surface. Here again, although there are some advantages, there will be an excessive friction loss in the supporting bearings for the rollers which must serve to transmit the heavy load.

It would be most desirable to utilize a rolling contact between the bearing transmitting surfaces since the friction between contacting rolling surfaces increases very slightly in proportion to the pressure upon the surface, therefore, rolling bearings elements might be provided between an outside roller and a supporting pin for the roller. I have disclosed such a construction in my pending application Serial No. 691,837, filed February 9, 1924, as applied to an alligator type of riveter, however, in further developing the original idea it has been found that a more efficient construction results from the use of double compound wedge or cam surfaces having a pressure-transmitting roller therebetween which is free to move in rolling contact with both of said cam surfaces with a minimum friction loss. If a simple roller is used between irregular cam surfaces, it might easily be displaced from its proper position by sliding relative to one of said cam surfaces and thereby result in an improper operation and therefore some means should be provided to retain the proper relative position between the movable axis of said roller and said cam surfaces. I might use pins or teeth upon the roller which cooperate with openings formed in the cam surfaces but in such a design the teeth or pins are easily broken off due to slight irregularities in construction so that some slight flexibility must be allowed between the meshing teeth of the roller and the roller itself.

It is, therefore, a purpose of my invention to provide a means for efficiently transmitting a variable pressure from a fluid cylinder, or other means providing initial uniform pressure, to the riveting plunger which includes double cam surfaces having a roller therebetween and means for retaining the proper relative position between said roller and said cam surface, which means is designed to allow a slight flexibility thus preventing breakage due to irregularities of construction.

A feature of my invention consists in the provision of a pin which supports a roller and a gear member in such a manner that a slight twisting movement between said gear member and said roller is allowed.

Further objects and advantages of my improvements will be more readily apparent in the following description taken in connection with the attached drawings which illustrate a preferred embodiment of my improvements as applied to a riveter of the plunger type in which—

Figure 1 is a vertical sectional elevation through the operating means for a plunger riveting head.

Figure 2 is a vertical sectional elevation transverse to Figure 1 taken on the plane indicated by 2—2 in Figure 1.

Figure 3 is a detail sectional view taken through the axis of one of the rollers and showing the meshing engagement between the roller gears and the cam surfaces.

Figure 4 is a vertical sectional elevation of the gear roller shown in Figure 3.

In the drawings, 10 is a portion of a U-shaped riveting frame which includes a bore 11 receiving bushings 12—13 for guiding a plunger 14. The upper live die of the riveter may be attached in any suitable manner to the lower portion 15 of said plunger. A housing 16 is mounted on the riveting frame 10 and includes a depending cylindrical portion 17 which is locked to the frame 10 by the key 18. To one side of the housing 16 is secured a main cylinder 19 held by tie rods 20. The cylinder head 20 of said cylinder 10 provides a mounting for a return cylinder 21 held by tie rods 22 and closed at its outer end by a head 23. Through the cylinders 19 and 21 slides a piston rod 24 to which is secured a return piston head generally denoted as 25, which slides in the cylinder 21 and a main piston 26, which slides in cylinder 19. The piston rod 24 is guided by a bearing 27 formed in the main cylinder head 20 and having suitable packing 28 for sealing the separate cylinder chambers. The piston rod 24 includes a screw-threaded portion 29 on which is mounted an enlarged head 30. The head 30 slides through an opening 31 formed in the housing 16. The purpose of using the head 30 is to provide cushioning means for the piston 24 since it is apparent that when the machine is used for a punching operation, the sudden decrease of pressure when the tool passes through the plate being punched would cause a sudden slap of the main piston head 26 against the end of the cylinder which, in this instance, would be the housing 16, but in my design, the introduction of the enlarged head 30 into the opening 31 of the housing 16 will cushion a portion of air between the piston head 26 and the housing 16. It should also be noted that the head 30 is provided with a tapered portion 32 on its left-hand end in Figure 1, and a cylindrical portion 33 which closely fits the opening 31. The tapered end will serve to guide the head 30 as the piston moves to the end of its stroke. As shown, the piston head 26 consists of two cap members 34 and 35 which retain suitable packing 36 therebetween at their outer conical edges. The cap 34 is held by the screwed head 30 while the cap 35 is screw-threaded to the piston rod 34 at the portion 37.

In order to transmit the transverse motion and pressure of the piston rod 24 to the vertically movable plunger 14, I have provided, as described in the statement of my invention, roller mechanism which may take a form such as shown in the disclosed embodiment. A wedge 38 is secured to the end of the piston rod 24 and is enclosed within the housing 16. The wedge 38 is provided with a flat upper surface 39 which is guided for straight line movement by the roller 40 freely movable between the flat surface 39 of the wedge and a guide plate 41 secured to or forming part of the housing 16. If desired, this roller may be a plain roller, but, in such case, stop means must be utilized at the ends of the guiding surfaces to prevent dislodgment of the roller. In the present embodiment I have shown racks 42 which are either secured to or formed integral with the wedge 38 and are provided with gear teeth along the upper horizontal edges which mesh with gears 44 rotating with the roller 40. The upper guiding plate 41 is also provided with rack plates 45 which mesh with the roller gears 44. It should be noted that the plane surface of the roller 40 will transmit the thrust and there will be no pressure brought to bear upon the ends of the gear teeth. The meshing gear teeth will only serve to maintain the geared-roller in its correct relative position during the travel of the wedge 38.

The upper end of the plunger 14 is provided with a cylindrical opening 47 which forms a mounting for a block 48 formed with a cylindrical centering portion 49 received in the opening 47 of the plunger. The block 48 is securely held in place by the pin 50. Pressure transmitted to the block 48 will push the plunger downward for a riveting operation. The plunger is caused to return by means of a spring 51 which is compressed by the downward movement of said plunger. Thus, as shown in Figure 1, the spring 51 is received in an opening 52 formed in the frame 10 and closed at its lower end by an adjustable screw-threaded spring cap 53. The right-hand end of the block 48 is formed with a pin 54 received in one end of the spring 51. In the position shown in Figure 1, the plunger 14 has been forced down to its lowest position and the spring 51 will exert force upon the block 48 to cause said plunger to return.

Pressure is transmitted from the wedge 38 to the block 48 by an adaptation of the inclined plane principle, as previously explained, and thereby provides increased pressure upon the plunger 14 relative to the pressure acting against the piston head 26. Furthermore, the pressure is made variable relative to the travel of the plunger by forming the lower side of the wedge 38 with a compound cam surface 55 and a correspondingly curved cam 56 is formed on the upper side of the block 48. The cam surfaces, although correspondingly formed are oppositely arranged. Excessive friction would develop if the cam surfaces 55 and 56 were to contact so I, therefore, utilize a roller 57, as shown in Figure 2, which is maintained in such a position relative to the cam surfaces 55 and 56 that the pressure contacting surfaces are substantially tangential to the surface of said roller and parallel to each other. It is obviously preferable to transmit the thrust through the roller on a diametrical plane since there is, therefore, no force tending to displace the roller from its proper position. The roller 57 is similar to the upper roller 40 and is provided with side gears 58 which mesh with the gear teeth formed on the lower edges of the rack plates 42. The pitch line of the rack gear teeth is correspondingly curved relative to the cam surface 55. The gears 58 rotating with the rollers 57 also engage with the rack plates 60 secured to or made integral with the block 48 which is secured to the plunger. Rack plates 60 are formed with gear teeth having a pitch line correspondingly curved relative to the cam surface 56.

It is apparent that upon retraction of the piston by admitting fluid to the return cylinder 21, the geared roller 57 will rotate and roll down the cam surface 56 of the lower block 48, while the upward movement of the plunger 14, due to the pressure of the spring 41, will maintain the geared roller in contact with the cam surface 55 of the wedge member 38, and, therefore, the axis of the geared roller 57 will move to the right and upward, while at the same time the upper geared roller 40 will move to the right thus the two rollers are maintained substantially in line to prevent a twisting strain upon the wedge 38.

As previously stated, the gear teeth do not receive direct vertical pressure since the pressure is transmitted from the upper and lower surfaces of the wedge 38 directly through the rollers 40 and 57 to the lower block 48 and to the upper block 41. The teeth are, therefore, only subjected to shearing stress which might be caused by slight inaccuracies of formation which prevent the gear teeth from meshing perfectly at all times during the movement of the rollers.

Theoretically, if perfect gear teeth could be formed, the construction thus far described would be wholly practicable but commercially, if the gears are integrally formed with or rigidly secured to the rollers, breakage of the teeth may occur. Therefore it has been found necessary to use a peculiar construction of the gear rollers which is shown in the detail Figures 3 and 4. This construction will allow a slight flexibility and prevent breakage of the teeth. A central pin 70 forms the mounting for the roller 57 and the side gears 58. The pin 70 is provided with a central hexagonal portion 71 which is received by an opening formed in the roller 57 correspondingly shaped and therefore the roller is non-rotatably connected to the pin. The ends of the pin 70 are similarly formed with hexagonal portions 72 which are correspondingly received in hexagonal openings formed in the gear members 58. To allow a slight movement of the gear teeth relative to the peripheral surface of the roller, the portions of the pin 70 between the central hexagonal portion 71 and the end portions 72 are formed with reduced necks 73. The reduced necks 73 allow a slight twisting of the ends of the pin relative to the central portion. In practice it is found the gear teeth may have a compensating movement of $\frac{1}{32}$ of an inch, which is entirely sufficient to allow for slight inaccuracies. The construction described for the geared roller 57 may be also utilized for the upper roller 40.

It is therefore possible to design the cam surfaces which contact with the roller in such a manner that the desired variable pressure upon the plunger 14 may be obtained so long as there is a substantially smooth curvature of the cam surface so the gears will freely mesh. The pressure transmitted by the wedge is wholly transmitted through the rollers without passing through bearing pins for the roller which occurs if the roller is maintained in a fixed position relative to a movable part. Therefore, a minimum friction loss results and provides a high efficiency of power consumption.

Many modifications may be made in the particular arrangement and design without departing from the spirit of my invention as expressed in the appended claims.

I claim:

1. In a machine for performing a riveting or like operation, a movable working member, a slidable pressure actuated member, means for transmitting the movement and pressure of said pressure actuated member to said working member, said means comprising a wedge carried by said actuated member, said wedge having a cam surface and gear teeth having a pitch line corresponding to said cam surface, a cooperating block carried by said working member, said block having a cam surface and gear teeth formed adjacent to said cam surface having a pitch line corresponding to said cam surface, a roller in rolling contact with both of said cam surfaces and a gear rotating with said roller in meshing relation with said gear teeth, and means for allowing a slight flexible movement between said roller and roller gear.

2. In a machine for performing riveting or like operations, a movable working plunger, a slidable pressure-actuated member, means for transmitting the movement and pressure of said pressure-actuated member to said working plunger with a mechnical advantage developing increased pressure upon said plunger, said means comprising cooperating cam surfaces carried by said members and an intermediate member in rolling contact with both said cam surfaces, means preventing relative sliding movement between the contacting surfaces of said intermediate member and said cam surfaces and means providing a slight flexibility of movement between said last-named means and said intermediate member.

3. In a machine for performing riveting or like operations, a movable working plunger, a slidable pressure-actuated member movable at a right angle to the direction of movement of said plunger, means for transmitting the movement and pressure of said pressure-actuated member to said working plunger with a mechanical advantage developing increased pressure upon said plunger, said means comprising cooperating wedge members carried by said pressure actuated member and said plunger, a roller member in rolling contact at diametrically opposite points with said wedge members, means preventing relative sliding movement of said roller with respect to said wedge members and means providing a slight flexibility of movement between said last-named means and said roller.

Signed at Chicago, Illinois, this 26th day of March, 1929.

JOHN C. HANNA.